(12) United States Patent
Adkins

(10) Patent No.: US 6,598,384 B1
(45) Date of Patent: Jul. 29, 2003

(54) INTAKE SHIELD FOR GAS TURBINE ENGINES

(76) Inventor: Richard Adkins, 4 Aplands Close, Child Okeford, Blandford Forum, Dorset DT11 8HR. (GB)

( * ) Notice: Subject to any disclaimer, the term of this patent is extended or adjusted under 35 U.S.C. 154(b) by 0 days.

(21) Appl. No.: 09/766,331

(22) Filed: Jan. 19, 2001

(51) Int. Cl.[7] .............................................. F02C 7/055
(52) U.S. Cl. ................... 60/39.092; 55/306; 415/121.2
(58) Field of Search ....................... 55/306; 60/39.092; 244/53 B; 415/121.2

(56) References Cited

U.S. PATENT DOCUMENTS

| | | | | |
|---|---|---|---|---|
| 2,641,504 A | * | 6/1953 | Robinson ................. | 415/121.2 |
| 3,483,676 A | * | 12/1969 | Sargisson ................... | 55/306 |
| 3,871,844 A | | 3/1975 | Calvin, Sr. | |
| 4,255,174 A | * | 3/1981 | Simpson ..................... | 55/306 |
| 4,304,094 A | * | 12/1981 | Amelio .................... | 60/39.092 |
| 5,411,224 A | | 5/1995 | Dearman et al. | |
| 5,591,904 A | | 1/1997 | Schafhaupt et al. | |
| 5,746,789 A | * | 5/1998 | Wright et al. ................. | 55/306 |

FOREIGN PATENT DOCUMENTS

GB        2 076 102 A       5/1980

* cited by examiner

Primary Examiner—Michael Koczo
(74) Attorney, Agent, or Firm—Melvin I. Stoltz

(57) ABSTRACT

An intake shield (3) comprises a hollow chamber (4) which locates over the intake (2) of a gas turbine engine (1). The chamber (4) has one or more walls (5) which are pervious to air but impervious to vortices and debris.

7 Claims, 6 Drawing Sheets

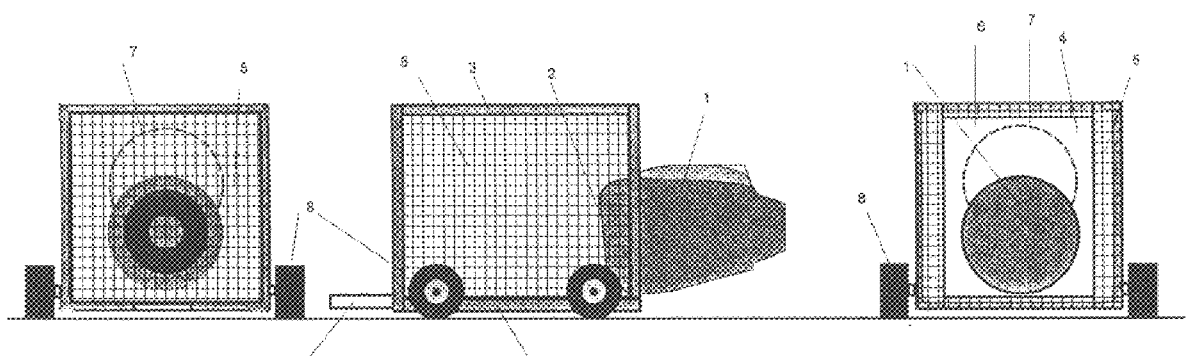

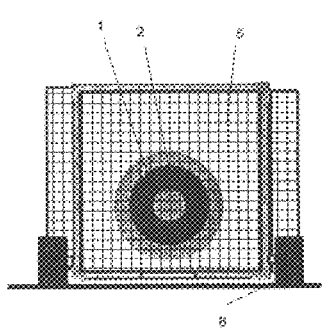
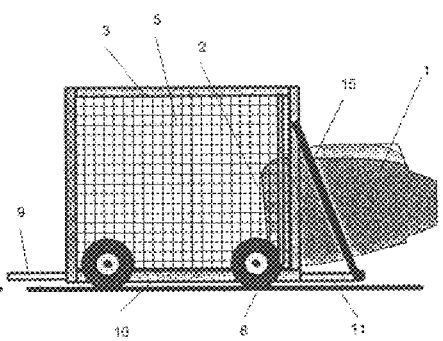
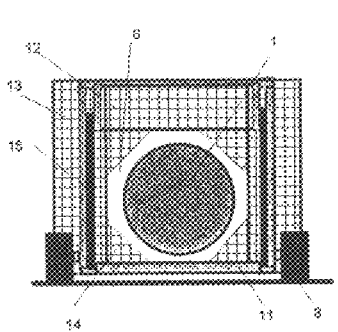
Fig 5   Fig 6   Fig 7
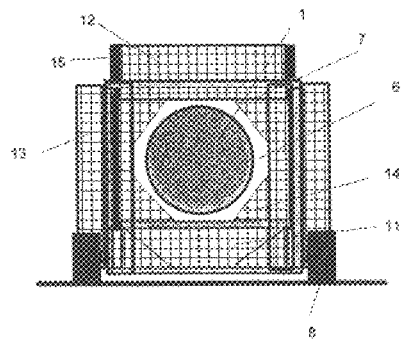
Fig 8

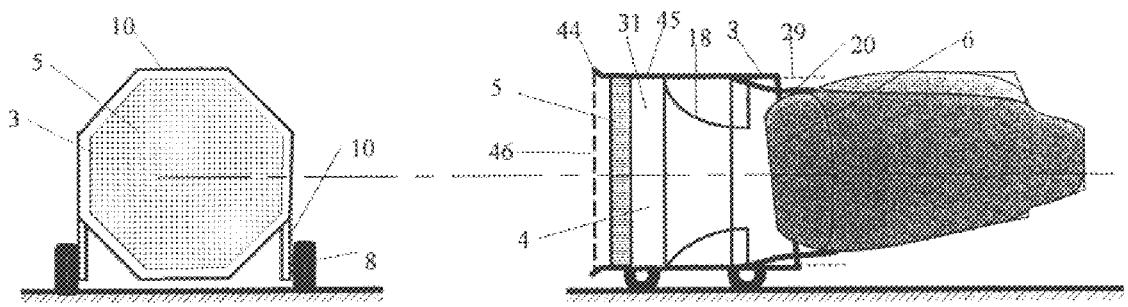
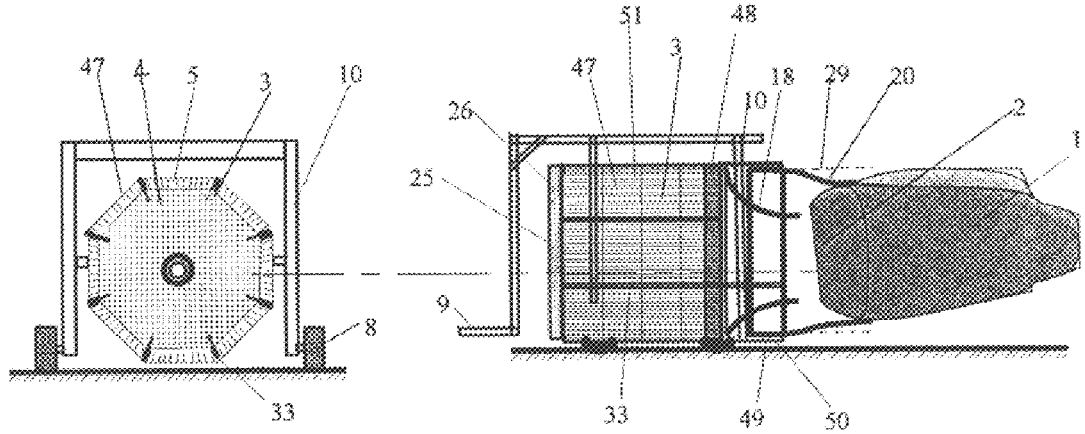

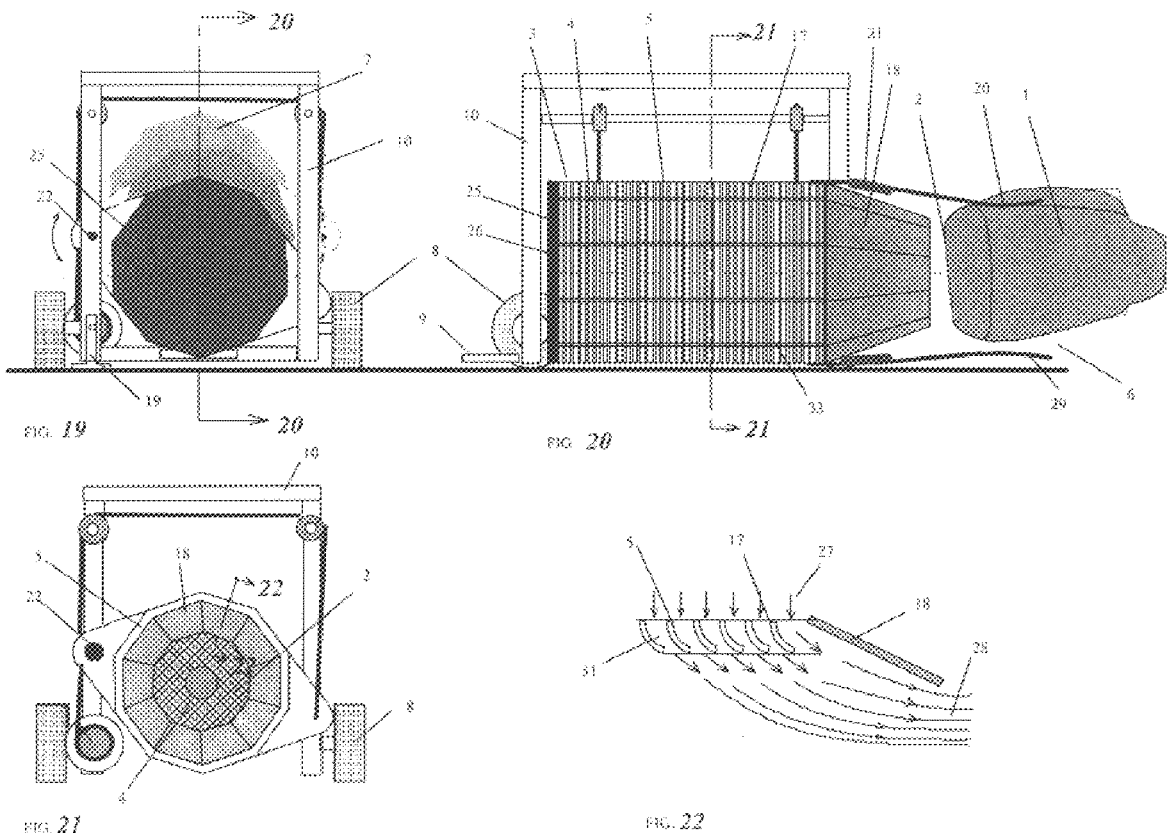

INTAKE SHIELD FOR GAS TURBINE ENGINES

FIELD OF THE INVENTION

This invention relates to intake shields for terrestrial and marine gas turbine engines and is concerned with the provision of an intake shield to be used while operating stationary gas turbine engines in order to protect them from the ingestion of debris and vortices and to reduce the level of noise generated while carrying out engine testing procedures.

Gas turbine engines consume copious quantities of air, which makes the operation of stationary engines difficult due to the ingestion of vortices. Such vortices are formed by the interaction of the entrained air with solid surfaces anywhere within the vicinity of the engine. The strengths of such vortices can be intensified by winds coming either from the sides or to the rear of the engine intake. Ingested vortices lead to excessive noise and engine instability and can cause mechanical damage to the engine.

A particularly troublesome example of vortex ingestion occurs when aircraft engines undergo ground run-up testing following maintenance work. Numerous complaints about excessive noise are currently received by airport operators and airlines. Furthermore, testing often has to be postponed when the wind is in an unfavourable direction because of the instability of the engine.

During present testing procedures, it is common practice to locate a debris guard around the engine intake as a protection for personnel and to prevent ingestion of debris into the engine, where it could cause damage. These debris guards are portable and partly enclose a rectangular space. They comprise a base, three sides which extend in height to approximately the centre of the engine, and a fourth side, which is of lower height so that it can pass underneath the engine. No tops are provided for these guards and their walls and bases are typically constructed from sturdy wire fences held in position by steel frames, the bases typically being attached to a chassis mounted on wheels.

Although the existing debris guards protect the engine from debris and form a personnel barrier, they do not protect the engine from the effect of vortices.

It is also known to provide special intake shields which are used to assess the noise level of new engines. These have been employed since research showed that high by-pass ratio aircraft engines are at least 10 decibels quieter when in flight than when running stationary close to the ground. Engine manufacturers make allowance for this phenomenon during noise surveys by mounting the engine rigidly on a high stand in order to reduce ingested vorticity, and fit a special bell-mouth engine intake to provide a uniform stream of air into the engine. To further reduce vorticity and turbulence, this intake draws its air through a very large spherical porous screen with the engine intake located close to its centre. The diameter of such a screen is many times greater than that of the engine, but the screens are fragile, expensive and too large to be suitable for on-wing testing of engines after maintenance. From the nature of their application, these spherical screens are designed not to attenuate the sound radiated from the engine but just to reduce the level of turbulence.

It is accordingly an object of the present invention to provide an intake shield which can be used to protect an engine from both debris and vortices while it is being tested close to the ground.

U.S. Pat. No. 5,411,224 (Dearman et al.) discloses a jet engine intake guard which includes a generally circular base ring member for connection to an engine cowl of a jet engine.

U.S. Pat. No. 3,871,844 (Calvin) discloses a screen apparatus for the air inlet of a jet turbine engine which is designed to prevent foreign objects from entering the air inlet.

U.S. Pat. No. 5,591,904 (Schafhaupt et al.) discloses an apparatus for use in diminishing intake vortexes at jet engines during testing which consists of a grating disposed near the ground below and directly in front of the engine inlet.

British Patent Specification No. 2,076,102 relates to a debris guard for mounting across the air intake of a gas turbine engine.

It is a further object of the present invention to provide an intake shield for a gas turbine engine air intake which provides improvements over the prior art devices disclosed in the specifications referred to above.

SUMMARY OF THE INVENTION

According to the present invention there is provided an intake shield for a gas turbine engine air intake, said shield comprising a wheeled structure containing a hollow chamber which locates over the engine intake so as to totally enclose the engine intake apart from an aperture through which the engine intake is inserted, said chamber having at least one wall which is formed with a plurality of flow passages so as to be porous to air but impervious to vortices and debris, and the dimensions of the chamber being such that, in use, the engine draws its air through the passages in said at least one wall which present a greater area for the flow of air than that of the engine intake.

The dimensions of the chamber may be such that the full quantity of air required by the engine can be drawn through the walls of the chamber without incurring a significant pressure loss.

One or more of the following features may also be provided:

a) means for adjusting the height of the shield to facilitate its location over the engine intake, b) means for adjusting the size and position of the aperture through which the engine intake is located, c) means for sealing the gap between the aperture and the engine, d) the sealing means are retractable, e) the wheels of said structure are on a wheeled chassis, f) the porous walls are arranged to direct the airflow towards the engine, g) the porosity is graded to produce a uniformity of airflow entering the engine, h) the porous walls are contoured to provide a uniformity of airflow entering the engine, i) part of a wall facing the engine is made of acoustic absorbing material, j) a settling length between the porous wall(s) and the engine intake in order for any turbulence or non-uniformity in the flow of air to settle, k) a nozzle to guide the air stream smoothly into the engine intake, l) guiding means for assisting guidance of the shield while locating it over the engine intake, m) a telescopic attachment to simplify coupling of the shield to the engine, and n) an anchor attachment for transmission of the thrust acting on the shield either to the ground or to an exhaust device located behind the engine.

BRIEF DESCRIPTION OF THE DRAWINGS

FIG. 1 is a front view of a first form of intake shield of the type suitable for the static testing of aircraft engines, FIG. 2 is a side view of the intake shield of FIG. 1 showing an aircraft engine inserted which has minimum ground clearance, FIG. 3 is a rear view of the intake shield of FIG. 1, together with parts of the aircraft engine, and indicating the range of applicable engine heights, FIG. 4 is a detail view showing the structure of a porous wall which is impervious to vortices and which forms part of the intake shield of FIG. 1, FIG. 5 is a front view of a second form of intake shield, in which the aperture for insertion of the engine intake into the shield is reduced in size by the use of movable walls, FIG. 6 is a side elevation of the intake shield of FIG. 5 with an engine inserted, FIG. 7 is a rear view of the intake shield of FIG. 5 with parts of an aircraft engine installed at the lower limits of the intake shield, FIG. 8 is a rear view of the intake shield of FIG. 5 with the components of the rear wall of the intake shield adjusted to accommodate an aircraft engine at the highest limits of the intake shield, FIG. 15 is a front view of a fifth form of intake shield, which is shorter in length than the first to fourth forms of intake shield, FIG. 16 is a sectional side elevation of the intake shield of FIG. 15, FIG. 17 is a front view of a sixth form of intake shield, FIG. 18 is a side elevation of the intake shield of FIG. 17, FIG. 19 is a front view of a seventh form of intake shield which features a different method of height adjustment and has porous walls constructed from curved vanes so as to direct the flow towards the engine and so reduce the level of turbulence and pressure loss, FIG. 20 is a sectional view of the intake shield of FIG. 19 along the line 20—20 of FIG. 19, FIG. 21 is a sectional view of the intake shield of FIG. 19, along the line 21—21 of FIG. 20, and, FIG. 22 is a section through the porous walls of the intake shield of FIG. 19, along the line 22—22 of FIG. 21.

DESCRIPTION OF THE PREFERRED EMBODIMENTS

Figure 9:
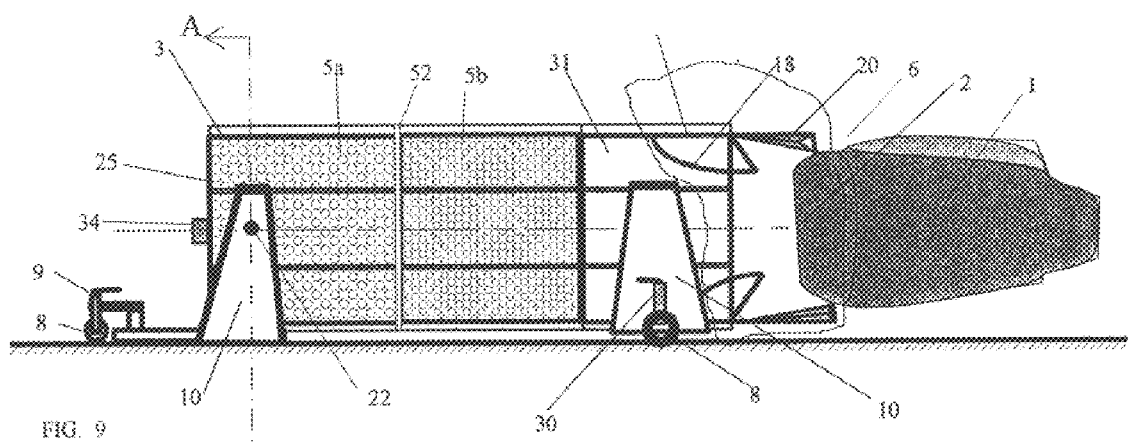
FIG. 9 is a side elevation of a third form of intake shield showing an inserted engine and with a cut-away illustration made in the region where the shield overlaps the engine intake in order to show important internal components.

Referring first to the first embodiment shown in FIGS. 1 to 4, an aircraft engine 1 is shown inserted through an aperture 6 made in a rear wall of the intake shield 3 so that the majority of the air entering the engine intake 2 flows from a hollow chamber 4 which is otherwise enclosed by the walls 5 of the intake shield 3. The air in the hollow chamber 4 is replenished by the flow of air through the walls 5, some or all of which are made porous to the flow of air but impervious to the flow of vortices and debris. This property can be achieved, in the manner shown in FIG. 4, by arranging for the length "d" of each flow passage through the wall 5 to be at least as great as half of the width "a" of each flow passage.

The front and side walls 5 of the intake shield 3 are preferably all of the lattice structure shown, as are the parts of the rear wall bounding the aperture 6. The dimensions of the chamber 4 are such that the full quantity of air required by the engine can be drawn through the walls 5 without incurring a pressure loss, which would significantly affect the operation of the engine.

The intake shield 3 can accommodate an engine as high as the location shown as 7. The walls 5 are mounted on a structure 10 which is equipped with wheels 8 and a tow hitch 9 so that it can be transported to and from the test engine by means of a suitable towing vehicle. Means may also be provided for adjusting the height of the shield, for example, a scissors hoist mechanism, to facilitate location of the intake shield 3 over the engine intake.

The intake shield 3 may incorporate means for rapidly extinguishing any fire which may occur in the engine.

An anchor attachment (not shown) may be provided so that the thrust acting on the shield can be transmitted either to the ground or to an exhaust device located behind the engine.

FIGS. 5 to 8 of the drawings show a second form of intake shield, in which the aperture for insertion of the engine intake can be reduced in size by the use of movable walls. The majority of the components of the embodiment of FIGS. 5 to 8 are similar to the corresponding components of the embodiment of FIGS. 1 to 4 and are indicated by the same reference numerals. The same method of use of reference numerals is employed for the further embodiments described below.

The embodiment of FIGS. 5 to 8 differs from that of FIGS. 1 to 4 in that the construction of the rear wall comprises movable sections. Section 11 is the lower aperture wall and is connected by mechanical links 15 to the upper aperture wall 12 such that their positions can be adjusted between the extreme locations shown in FIGS. 7 and 8. In addition, the rear wall consists of movable sections 13 at the sides and fillets 14, all of which can be adjusted to accommodate engines of different size but, at the same time, will limit the leakage of air through the aperture remaining around the engine. The use of movable sections also simplifies the procedure of location of the intake to the aircraft engine and will accommodate movements of the engine, which may occur while it is being operated.

Figure 10:
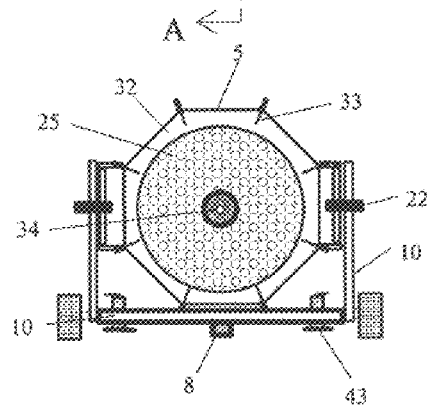
FIG. 10 is a front view of the intake shield of FIG. 9.
Figure 11:
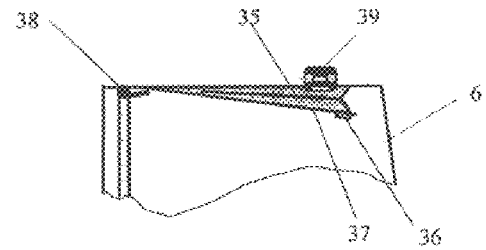
FIG. 11 shows a retractable seal arrangement for sealing the gap between the intake shield of FIG. 9 and the engine, while allowing for variations in size.

FIGS. 9 to 11 show a third embodiment which, in addition to preventing the ingestion of vortices, also prepares the flow in the form of an air jet which is more acceptable to the engine intake. As shown in the drawings, the intake shield 3 of the third embodiment is approximately cylindrical and has an effective diameter which is greater than that of the engine intake 2. The chamber walls comprise a plurality of flat panels 5a and flat panels 5b, which can be of different porosity in order to control the uniformity of flow distribution of air into the engine-inlet. Both types of panels 5a and 5b are impervious to the flow of vortices but the combination of panels 5a and 5b enables the intake of the total engine air into the chamber without an undesirable pressure loss, normally judged to be less than 2 kPa. The panels 5a and 5b are divided by a flange 52.

The chamber also includes a settling length 31 to allow for the decay of turbulence and an aperture 6 for insertion of the intake of the engine 1. A nozzle 18 is provided to both accelerate and reduce the cross section of the airflow before it enters the engine. A retractable seal 20 is provided in order to prevent the access of air between the shield and the engine casing. The seal 20 is in the form of a bellows with a flexible wall 35, a hinge 38, an air valve 39, a plate 37 and a cushion pad 36. The suction generated by operation of the engine causes the seal 20 to inflate such that the cushion pad 36 contacts the engine perimeter. Without the suction created by the engine, the seal 20 retracts under the action of return springs (not shown) away from the engine and its nacelle in order to facilitate engagement or removal of the shield.

The end of the chamber opposite to the engine is enclosed by a flange 32 and an end plate 25 in which is mounted a device use in assisting with the alignment procedure of the intake shield 3 with the engine 1. The structure of the shield 3 is supported by bracing struts 33 and frames 10 and is made transportable by the wheels 8 and the tow hitch 9. The height of the intake shield 3 can be adjusted by levelling jacks 30, which are provided to adjust the height of the general structure, and also by rotation of the chamber about the hinge 22. Adjustable feet 43 are lowered to the ground during testing in order to prevent movement of the shield and to transmit the aerodynamic loads to the ground.

The design of the third embodiment is thus such as to prepare the approaching airstream to one that closely resembles the air conditions at the air intake during flight, a condition for which the design of the air intake is optimized. The intake shield experiences approximately one third of the forward thrust which would otherwise be experienced by the engine and this thus reduces the thrust required from any balancing engine on the opposite wing of the aircraft and hence leads to a further reduction in noise.

As in the other embodiments, the pressure lost by the air in flowing through the intake shield does not have any appreciable effect upon engine performance.

Figure 12:
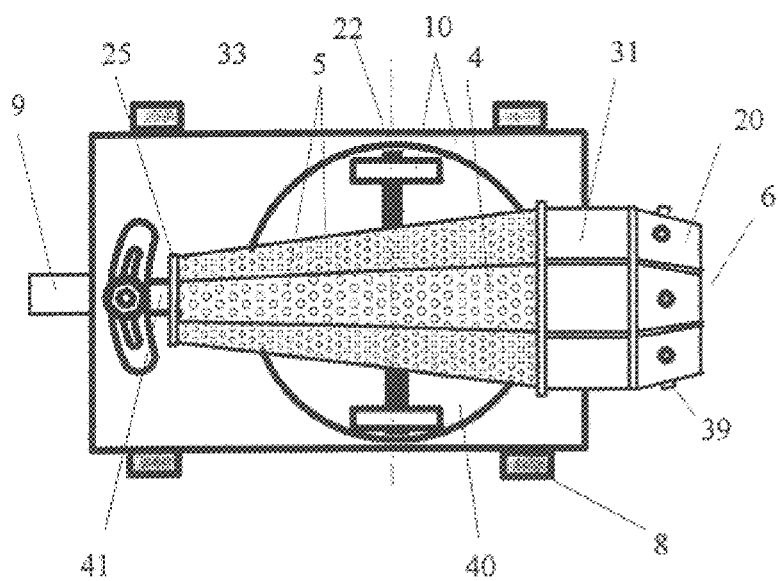
FIG. 12 is a plan view of a fourth form of intake shield.
Figure 13:
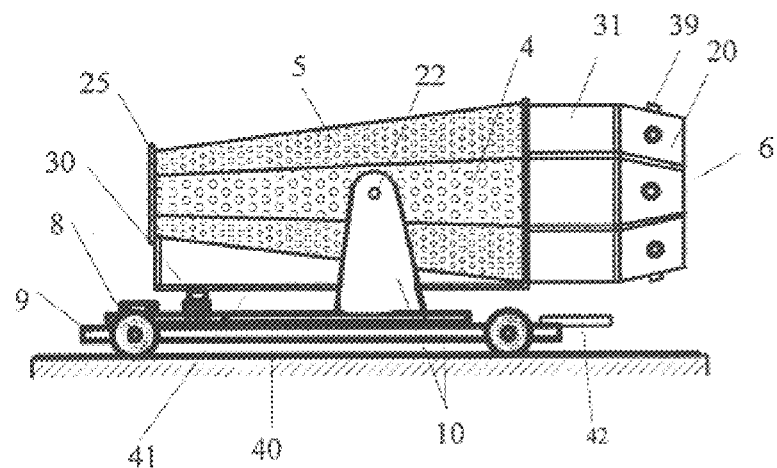
FIG. 13 is a side elevation of the intake shield of FIG. 12.
Figure 14:
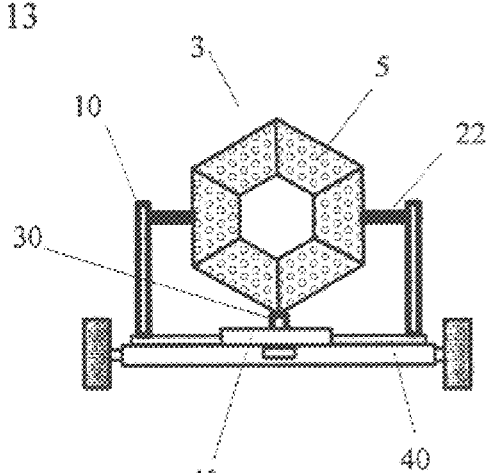
FIG. 14 is a front view of the intake shield of FIG. 12.

The fourth embodiment shown in FIGS. 12 to 14 includes many components similar to those of the previous embodiments described above but differs therefrom in the shape of the hollow chamber 4, which is tapered along its length in order to influence the distribution of air entering the engine as an alternative to graduated porosity of the wall panels 5. A turn-table 40 with an adjusting lever and lock 41 is provided to assist in alignment of the shield 3 to the engine.

The fifth embodiment of intake shield, shown in FIGS. 15 and 16, is shorter in length than the previously described embodiments. With this embodiment, the main air flow is admitted into the chamber through a bell mouth intake 44 via a protective shield 46 designed to protect the intake screen from mechanical damage, and then a porous screen 5 which is impervious to vortices. As with the previous embodiments, a settling section 31 is partially bounded by a non-porous wall 45 and a nozzle 18 is provided in order to condition the air in preparation for the engine inlet 2. A flexible seal 20 includes intermeshing leaves of flexible material which are spring-loaded to locate into a position close to 29 when the engine is not operating and then drawn in by the suction of the engine so that they locate against its casing as shown by 20 when the engine is in operation.

The sixth embodiment shown in FIGS. 17 and 18 includes an end wall 25 which is a solid plate and to which is attached an acoustic absorbing panel 26 so that it faces into the chamber 4 and reduces the noise radiated forwards by the engine. The side panels of the chamber 4 are constructed from thin longitudinal plates 47 which are spaced apart leaving gaps 51 which permit the ingestion of air but which are sufficiently narrow as to make them impervious to vortices. A honeycomb-type structure 48 is included to reduce the level of any turbulence that may have been present in the airstream and is an alternative to the settling length of the embodiments described above.

A flexible seal 20 is attached to an extension tube 50 which is arranged so that it can travel relative to the remainder of the intake shield by virtue of bearings 49 so that it can be extended over the engine intake after the other major components of the shield have been positioned close to the engine intake 2. This measure simplifies the application of the shield to the engine intake. The chamber so formed is made rigid by structural members 33. This method of construction gives a high level of porosity and enables the air to distribute itself naturally prior to acceleration through the nozzle 18.

The seventh embodiment is shown in FIGS. 19 to 22 and again includes many features described above in relation to the previous embodiments. The side panels 5 of the chamber 4 of this seventh embodiment are constructed from a plurality of transverse curved thin plates 17 which are spaced apart leaving gaps 51 for the ingestion of air as indicated by the arrows 27, the flow of air then being turned by the plates 17 into the direction indicated by the arrows 28 towards the nozzle 18 and engine intake 2. The chamber so formed is made rigid by structural members 33.

What is claimed is:

1. An intake shield for use with a gas turbine engine air intake, in which means are provided for adjusting the height of the shield to facilitate its co-axial alignment with the engine intake, said shield comprising a wheeled structure containing a hollow chamber which locates over the engine intake so as to totally enclose the engine intake apart from an aperture through which the engine intake is inserted, said chamber having at least one wall which is formed with a plurality of flow passages so as to be porous to air but impervious to vortices and debris, and the dimensions of the chamber being such that, in use, the engine draws its air through the passages in said at least one wall which present a greater area for the flow of air than that of the engine intake.

2. An intake shield as claimed in claim 1, in which the wheels of said structure are on a wheeled chassis.

3. An intake shield as claimed in claim 1, in which said one or more walls are so arranged as to direct the airflow towards the engine.

4. An intake shield as claimed in claim 1, which includes a plurality of porous walls which are contoured to provide a uniformity of airflow entering the engine.

5. An intake shield as claimed in claim 1, which includes a settling length between the porous wall/walls and the engine intake in order for any turbulence or no-uniformity in the flow of air to settle.

6. An intake shield as claimed in claim 1, which includes a nozzle to guide the air stream smoothly into the engine intake.

7. An intake shield for use with a gas turbine engine air intake, said shield comprising a wheeled structure containing a hollow chamber which locates over the engine intake so as to totally enclose the engine intake apart from an aperture through which the engine intake is inserted, said chamber having at least one wall in which a part of the wall facing the engine intake is made of acoustic absorbing material and is formed with a plurality of flow passages so as to be porous to air but impervious to vortices and debris, and the dimensions of the chamber being such that, in use, the engine draws its air through the passages in said at least one wall which present a greater area for the flow of air than that of the engine intake.

* * * * *